United States Patent
Clark et al.

[11] Patent Number: 5,362,576
[45] Date of Patent: Nov. 8, 1994

[54] CURRENT-ACTIVATED BYPASS SWITCH

[75] Inventors: Thomas Clark, Santa Monica; David M. McCormick, Camarillo; Alan Whitebook, Santa Clarita, all of Calif.

[73] Assignee: Reynolds Industries, Incorporated, Los Angeles, Calif.

[21] Appl. No.: 923,068

[22] Filed: Jul. 31, 1992

[51] Int. Cl.⁵ .................. H01M 14/00; H01M 2/00
[52] U.S. Cl. ............................... 429/7; 429/61; 429/62
[58] Field of Search ...................... 429/61, 62, 7

[56] References Cited

U.S. PATENT DOCUMENTS

| | | | |
|---|---|---|---|
| 3,924,688 | 12/1975 | Cooper et al. | 169/61 |
| 4,855,195 | 8/1989 | Georgopoulos et al. | 429/62 |
| 4,935,315 | 6/1990 | Herrin | 429/61 |
| 4,975,341 | 12/1990 | Tucholski et al. | 429/62 |
| 5,215,834 | 6/1993 | Reher et al. | 429/61 |

OTHER PUBLICATIONS

"Survivable Power Subsystem (SUPER) Phase II Interim Report (U)," TRW, Inc., vol. 1, 18 Dec. 1990.

*Primary Examiner*—Cecilia Tsang
*Attorney, Agent, or Firm*—Pretty, Schroeder, Brueggemann & Clark

[57] ABSTRACT

A switch is operated by an electrical current to automatically change from a ready condition to a tripped condition. The switch includes a fixed cylindrical contact and a movable plunger contact that are held apart by a thermal holding link acting against the force of a spring. When the switch in the ready condition, an electrical current of sufficient magnitude passing through the thermal holding link will weaken and separate the link and thereby allow the spring to move the plunger contact into electrical contact with the cylindrical contact. In an alternative embodiment, the switch can be configured to be closed in the ready condition, in which case current does flow through the cylindrical contact and the plunger contact, but ceases when the switch is changed to the tripped condition.

11 Claims, 2 Drawing Sheets

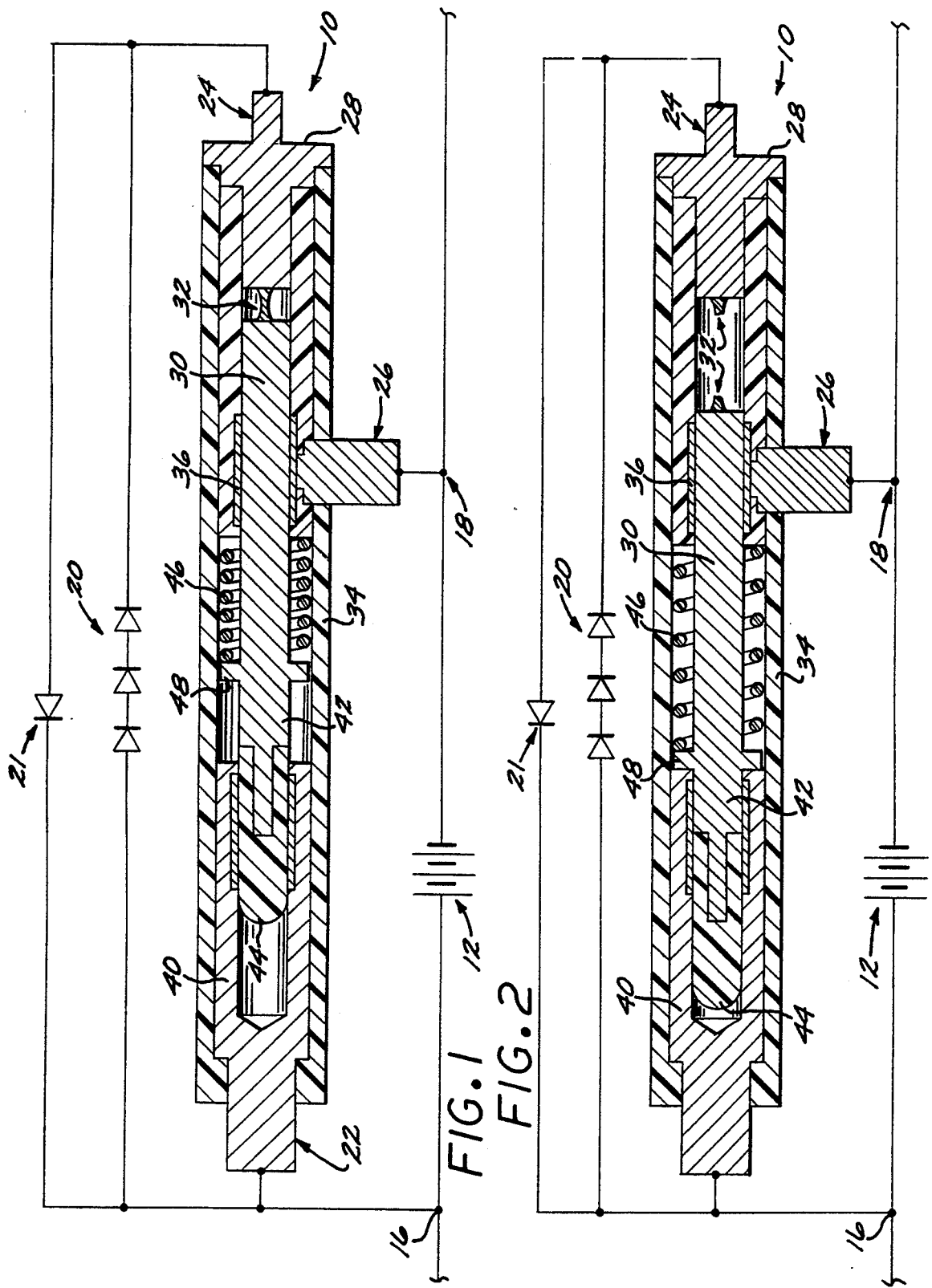

CURRENT-ACTIVATED BYPASS SWITCH

BACKGROUND OF THE INVENTION

1. Field of the Invention

This invention relates generally to electrically-activated switches and, more particularly, to switches that can be activated to allow current to bypass an electrical component.

2. Description of the Related Art

In a wide variety of electrically-operated devices, it sometimes becomes necessary to bypass a defective component. For example, one cell of a multi-cell battery sometimes can fail after being placed in use. A battery cell can fail, for example, if the battery is physically damaged, if the chemicals in the battery evaporate away, or if the battery electrodes corrode. When a battery cell fails, the internal resistance of the cell typically increases, which inhibits charging of the cell and can damage the remaining cells in the battery, causing the entire battery to fail. Such a cell failure also can electrically isolate the remaining cells, again causing the entire battery to fail. In many instances, such as if the battery is located in a satellite in earth orbit, the battery cell cannot be easily replaced and therefore is preferably bypassed.

A battery cell typically is bypassed using a bypass loop that includes both charge diodes and a discharge diode, connected in parallel with the battery cell. In the case of a multi-cell battery, each cell must be fitted with such a diode bypass loop. Typically, the charge diodes include several diodes connected in series such that their forward-bias voltage is greater than the cell voltage. These charge diodes do not affect normal operation of the battery cell. However, if the cell becomes defective and its resistance increases, then, during battery charging, the cell and charge diodes constitute a current dividing network, and substantially all of the charge current will be shunted around the defective cell and through the charge diodes. The individual current rating of the charge diodes ordinarily is on the order of 10 amperes or less.

The discharge diode typically is a single diode that is reverse biased during battery charging but forward biased to conduct current during battery discharging. In this way, during battery discharging, the battery current is shunted around the defective cell and through the discharge diode. The current rating of the discharge diode ordinarily is on the order of 50 amperes or more.

Although providing a battery network with diode bypass loops of this kind effectively solves the problem of bypassing defective battery cells that are inaccessible, particularly in satellite applications, use of the diode bypass loops also carries certain disadvantages. For example, conducting current through the diodes after a battery cell failure causes a voltage drop and generates heat. The thermal design of the battery must take this into account. The generation of heat also means that the physical location of the diodes can become critical. Also, as the cell size increases, the diode size, weight, and cost can become significant. Further, the voltage drop from the diode during discharge detracts from the total voltage that the battery would otherwise supply. Additional cells therefore might be required, to achieve a desired overall battery voltage.

From the foregoing discussion, it should be apparent that there is a need for a component bypass switch that can bypass a defective component, such as a defective battery cell, and that can do so with minimal weight, cost, and thermal restrictions. The present invention satisfies this need.

SUMMARY OF THE INVENTION

The invention provides an electrically-activated switch that is initially operable in a ready condition, in which current can flow through a first portion of the switch, and automatically is changed to operate in a tripped condition, in which current stops flowing through the first portion and instead flows through a second portion of the switch. The switch is typically used to bypass an electrical component and is coupled to the component circuit by means of three connection points, including a bypass terminal, a ready terminal, and a coupling terminal. The bypass terminal is connected to a fixed bypass contact, and the ready terminal is connected to a movable plunger contact. The coupling terminal connects the plunger contact with the circuit.

The bypass terminal and the ready terminal are connected together by a bypass loop. If the electrical component, such as a battery cell, becomes defective, current typically will by shunted around the component, through the bypass terminal of the switch, the bypass loop, and the ready terminal. At the ready terminal, the current will flow through the first portion of the switch and the coupling terminal, completing the circuit to the network and thereby bypassing the defective component.

When the bypass current flowing through the first portion of the switch is of sufficient magnitude, it activates a thermal holding link that automatically releases the plunger contact. A compressed coil spring then moves the plunger contact so as to transition the switch to the tripped condition. When the switch has been tripped, the first portion of the switch is opened and the second portion is closed. In this way, current is shunted around the defective component, through the bypass terminal, the second portion of the switch, and the coupling terminal. The switch is constructed such current can flow through the second portion of the switch with little or no voltage loss.

A switch in accordance with the invention has particular utility in relation to rechargeable batteries. In such a use, the bypass loop connecting the bypass terminal and the ready terminal can include charging diodes and a discharge diode for redirecting current flow in the event of a defective battery cell, as with conventional bypass systems. Unlike conventional bypass systems, however, the charging diodes and discharge diode are themselves bypassed upon actuation of the thermal holding link, which is configured to enable current to flow through the diodes only for a relatively short time period before current is routed through the second portion of the switch. This automatically eliminates the diodes from the bypass loop and therefore eliminates the voltage drop and heat generation associated with conventional diode bypass systems.

The invention also can be implemented as a single-pole, double-throw switch. Preferably, such a switch includes a generally cylindrical fixed contact opposed by a pin-type plunger contact that is held back from the fixed contact against the force of a spring by a thermal holding link, such as a thin metal strip. If a sufficient current passes through the metal strip, the strip will melt, thereby releasing the plunger contact to move into engagement with the fixed contact. This opens a previously closed pair of contacts and closes a previously open pair of contacts.

In another embodiment of the invention, the bypass switch can comprise a normally-closed plunger contact that releases when a predetermined current threshold is exceeded. This disconnects the plunger contact from a fixed contact.

Other features and advantages of the invention should become apparent from the following description of the preferred embodiments, taken in conjunction with the accompanying drawings, which illustrate, by way of example, the principles of the invention.

BRIEF DESCRIPTION OF THE DRAWINGS

FIG. 1 is a cross-sectional diagram of a current-activated bypass switch constructed in accordance with the present invention, shown in a ready condition.

FIG. 2 is a cross-sectional diagram of the bypass switch illustrated in FIG. 1, shown in a tripped condition.

Figure 3:
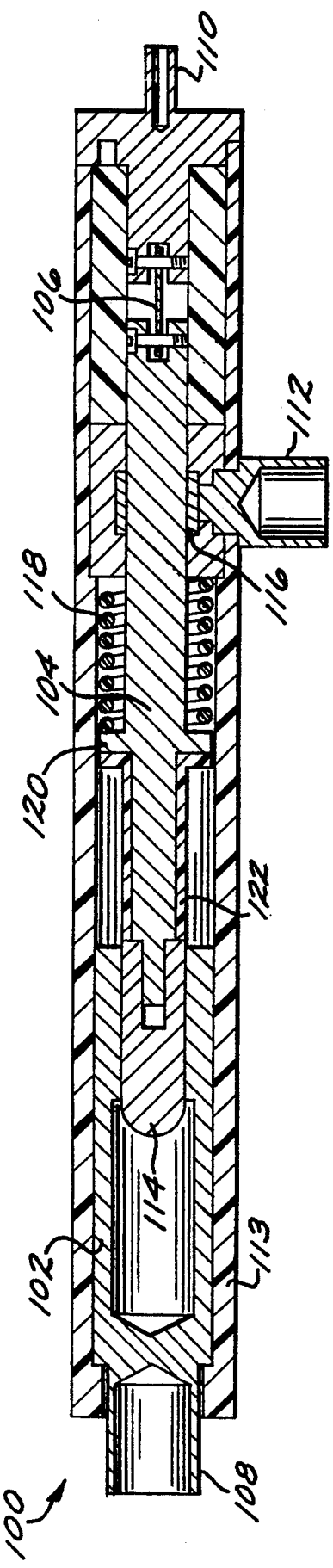
FIG. 3 is a cross-sectional diagram of a second embodiment of a current-activated bypass switch constructed in accordance with the present invention, this embodiment adapted to be normally closed and shown in a ready condition.

DESCRIPTION OF THE PREFERRED EMBODIMENTS.

Referring now to the drawings, and in particular to FIGS. 1 and 2, there is illustrated a bypass switch 10 connected in parallel with a battery cell 12 at a positive terminal 16 and a negative terminal 18. The bypass switch is shown in a ready condition in FIG. 1 and in a tripped condition in FIG. 2. Connected in parallel with the bypass switch are three series-connected charging diodes 20 and a discharge diode 21. When the battery cell is functioning properly, a battery voltage is developed between its positive and negative terminals.

When the battery cell 12 is being recharged, a charging current is made to flow through the cell, from the positive terminal 16 to the negative terminal 18. However, if the battery cell becomes defective, with high internal resistance, and if the bypass switch 10 is in the ready condition, the charging current is shunted through the charging diodes 20 connected in parallel with the bypass switch and through a first portion of the bypass switch, depicted on the right side of the switch in FIG. 1. As will be described below, this charging current causes the bypass switch to change to a tripped condition, as illustrated in FIG. 2. In this tripped condition, the charging current is shunted through a second portion of the bypass switch, depicted on the left side of the switch in FIG. 2, such that the charging diodes 20 also are bypassed. Thus, after the bypass switch 10 has been tripped, the charging diodes 20 no longer draw current as part of the bypass loop and do not produce unwanted heat or voltage drop.

The bypass switch 10 operates in a similar fashion when the battery cell 12 is being discharged. In that case, a discharge current flows through the cell, from the negative terminal 18 to the positive terminal 16. If the battery cell becomes defective, with high internal resistance, and if the bypass switch 10 is in the ready condition, the discharge current from the remaining cells of the battery is then shunted through the discharge diode 21 connected in parallel with the bypass switch and through the first portion of the bypass switch, which is depicted on the right side of FIG. 1. This causes the bypass switch to change to the tripped condition (FIG. 2). In this tripped condition, the discharge current is shunted through the second portion of the bypass switch, which is depicted on the left side of FIG. 2. The battery cell 12 and the discharge diode 21 thereby are bypassed.

Thus, the bypass switch 10 can be tripped by either a charging current or a discharge current. After such tripping, not only is the defective battery cell 12 bypassed, but the diodes 20 and 21 also are bypassed. Unwanted voltage drop and heat generation thereby are avoided. Although the operation of the bypass switch 10 is most easily understood with reference to a battery cell circuit, it should be understood that the bypass switch has wide application in circuits that require alternate current paths during operation.

The bypass switch 10 illustrated in FIGS. 1 and 2 includes a bypass terminal 22, a ready terminal 24, and a coupling terminal 26 that are used to couple the switch to a circuit, such as one including the battery cell 12. As noted above, when the switch is in the ready condition, current is allowed to flow through the first portion of the switch, which includes the ready terminal 24, a ready contact 28, a movable plunger contact 30, and a thermal holding link 32 interconnecting the ready contact and the plunger contact. The plunger contact and holding link are contained within an insulated housing 34. The plunger contact is electrically coupled to the coupling terminal 26 by a contact sleeve 36.

As current is passed through the first portion of the bypass switch 10, such as when the internal resistance of the defective battery cell 12 increases, the temperature of the holding link 32 due to resistance heating begins to weaken or melt the link. At a predetermined temperature, the holding link separates and a compressed coil spring 46 urges the plunger contact forwardly, i.e., leftwardly in FIGS. 1 and 2, to open circuit the first portion of the switch. Thereafter, current stops flowing in the first portion of the switch and instead flows in the second portion.

The second portion of the bypass switch 10 carries current only after the switch has been tripped. It includes the bypass terminal 22, a generally cylindrical, conductive, fixed contact 40, and a forward portion 42 of the plunger contact 30. The forward plunger portion includes a nose piece 44 that is constructed from an insulating material and that is sized to fit within the cylindrical fixed contact. The spring 46 is located in the switch housing 34 and presses against a flange 48 of the plunger contact, to urge the forward plunger portion into the fixed contact. The thermal holding link 32 ordinarily holds the plunger in contact with the ready contact 28, against the force of the spring 46. The insulating nose piece is received into the conductive fixed contact 40, up to but not including the forward portion 42 of the plunger contact. In this way, the nose piece ensures that the second portion of the switch is an open circuit when the switch is in the ready condition (FIG. 1).

When the bypass switch 10 is changed to the tripped condition illustrated in FIG. 2, the thermal holding link 32 has separated and the spring 46 has moved the plunger contact 30 fully into the conductive fixed contact 40, where the plunger flange 48 abuts the fixed contact. Current can then flow from the bypass terminal 22 through the fixed contact, the plunger contact, and the contact sleeve 36 to the coupling terminal 26. Thus, where the switch 10 is used in conjunction with a bypass loop around a battery cell 12, the diodes 20 and 21 are bypassed when the switch is tripped. This eliminates the diodes from the circuit, thereby eliminating the voltage drop caused by the diodes and the resulting heat.

In another embodiment of the invention, illustrated in FIG. 3, a bypass switch 100 again includes a fixed conductive contact 102, a movable conductive plunger contact 104, and a thermal holding link 106. However, this switch operates in a normally closed manner. That is, the plunger is ordinarily electrically connected to the fixed contact, but is disconnected when the holding link opens. The switch 100 is coupled by a bypass terminal 108, a ready terminal 110, and a center terminal 112. For simplicity, circuitry with which the switch 100 can be associated is not shown.

FIG. 3 shows that the switch 100 includes an insulating housing 113 and a nose piece 114 that ordinarily is in contact with the fixed, conductive contact 102. Unlike the embodiment illustrated in FIGS. 1 and 2, however, the nose piece is constructed of a conductive material so that current can flow in the ready condition from the bypass terminal 108 through the fixed contact 102, the nose piece 114, the plunger contact 104, a contact sleeve 116 to the center terminal 112. In the ready, or armed condition, current also will flow through the ready terminal 110 and the thermal holding link 106. After a current has flowed for sufficient time through the thermal holding link, the link will separate and the plunger will be urged by a compressed coil spring 118 pressing against a flange 120 of the plunger, to move the nose of the plunger into the fixed contact 102. The plunger will move until the flange 120 abuts the fixed contact 102. This places the switch in a tripped condition, and no current will flow. Control of the switch is determined by the circuit connected to the ready terminal 110.

Current will not flow through the bypass switch 100 in the tripped condition because the portion of the plunger 104 that is in contact with the fixed conductive contact 102 is covered with an insulating sleeve 122. Thus, in the ready condition, current will flow through the switch, between the bypass terminal 108 and both the center terminal 112 and the ready terminal 110. In the tripped condition, the switch will be open.

Figure 4:
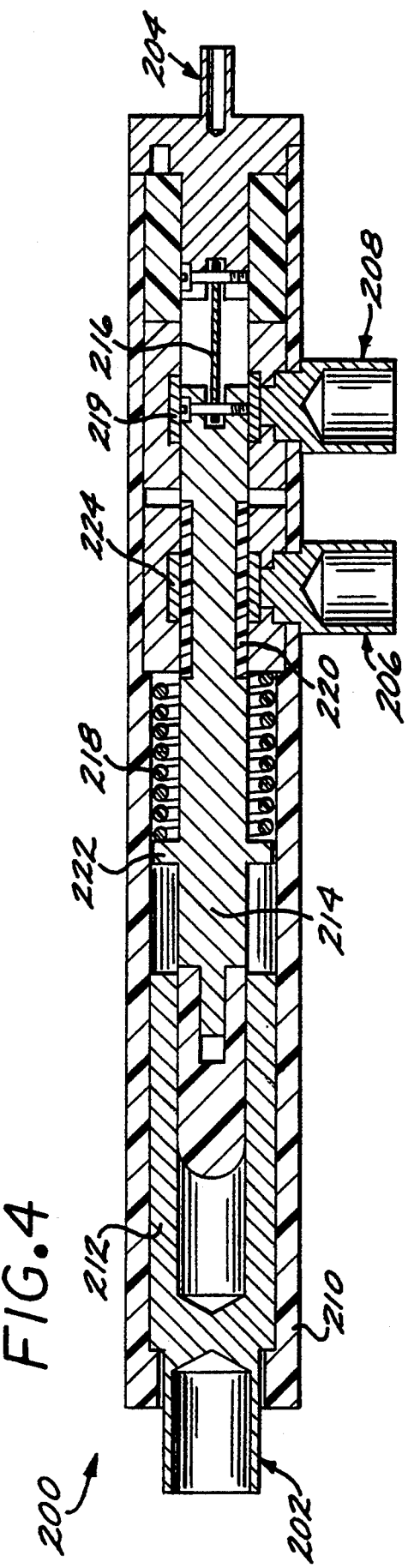
FIG. 4 is a cross-sectional diagram of a third preferred embodiment of a current-activated bypass switch constructed in accordance with the present invention, this embodiment being of a single-throw, double-pole type and shown in a ready condition.

FIG. 4 shows a single-pole, double-throw switch 200 constructed in accordance with the invention. The switch includes a bypass terminal 202, a ready terminal 204, a first center terminal 206, and a second center terminal 208. Current is directed through the switch to either the first center terminal or the second center terminal, thereby providing the two throws of the switch. The inner switch components are housed within an insulating housing 210 and include a fixed, conductive contact 212 and a movable plunger contact 214. A thermal holding link 216 holds the plunger against the force of a compressed coil spring 218.

When the switch 200 is in a ready condition, current flows through the thermal holding link 216 and a contact sleeve 219, between the ready terminal 204 and the second center terminal 208. The plunger 214 is provided with an insulating layer 220 adjacent the first center terminal 206 such that, when the switch is in the ready condition, current flows through the second center terminal 208 but not the first center terminal 206. When the thermal link 216 separates, the plunger is moved by the force of the spring 218 until a plunger flange 222 abuts the fixed contact 212. In that tripped condition, no portion of the plunger remains in electrical contact with the contact sleeve 219 or the second center terminal 208. Instead, the portion of the plunger previously adjacent the second center terminal is moved adjacent the first center terminal. Thus, current can flow between the bypass terminal 202 and the first center contact 206, via the fixed contact 212, the plunger 214, and a contact sleeve 224.

The embodiments illustrated in the drawings have been described above generally in connection with battery bypass circuits. It is to be understood, however, that the switches have applicability with respect to a wide variety of switching circuits and are especially useful when it is desired to provide alternative circuit paths that are automatically selected without circuit losses and penalties in added heat and weight that are frequently associated with conventional bypass devices and switching circuits.

The present invention has been described above in terms of a presently preferred embodiment so that an understanding of the invention can be conveyed. There are, however, many configurations for switches not specifically described herein, but to which the present invention is applicable. The present invention should therefore not be seen as limited to the particular embodiments described, but rather, it should be understood that the present invention has wide applicability with respect to switches and bypass devices of a wide variety of configurations. Accordingly, the invention is defined only with reference to the following claims.

We claim:

1. A switch adapted for use in an electrical circuit and for changing its state from normally open to closed, or from normally closed to open, the switch comprising:
   a generally cylindrical contact that is electrically coupled to a first terminal of the electrical circuit;
   a movable switch contact comprised of a conductive material that is electrically coupled to a second terminal of the electrical circuit;
   a third terminal of the electrical circuit that is electrically coupled to the movable switch contact;
   closing means for applying a force that urges the cylindrical contact and the movable switch contact toward each other; and
   holding means for holding the movable switch contact against the force of the closing means and for conducting current from the movable switch contact to the third terminal;
   wherein the holding means ceases to hold the movable switch contact when a predetermined current flows through the holding means, such that the closing means urges the movable switch contact into electrical contact with the cylindrical contact.

2. A switch as defined in claim 1, wherein the movable switch contact comprises a cylindrical plunger that is moved by the closing means linearly toward the cylindrical contact when the holding means ceases to hold it.

3. A switch as defined in claim 1, wherein the holding means comprises a thermally-activated conductive strip that is heated by the flow of current therethrough, such that the force of the closing means can pull the strip apart.

4. A switch as defined in claim 1, wherein:
the movable contact comprises a generally cylindrical plunger that is axially aligned with the cylindrical contact; and
the closing means comprises a coil spring.

5. A switch as defined in claim 4, wherein the plunger includes a nose portion formed of a non-electrically conductive material.

6. A battery bypass device for use with a battery cell that is connected to a battery circuit for charging and discharging, the bypass device including a diode circuit having a bypass diode that is connected across the battery cell such that the diode does not carry any substantial charging or discharge current when the battery cell is properly functioning, but carries charging or discharge current around tile cell when the cell is defective, the bypass device further including:
switching means for providing a closed circuit condition in the diode circuit when the battery cell is properly functioning and for providing an open circuit condition in the diode circuit when the battery cell is defective, the switching means including
a generally cylindrical switch housing,
a movable, electrically-conductive contact located within the housing and electrically coupled to the diode,
an electrically-conductive bypass terminal located within the housing and electrically coupled to the battery circuit,
closing means for applying force that urges the movable contact and the bypass terminal into electrical contact with each other, and
holding means for restraining the closing means from moving the movable contact and the bypass terminal into electrical contact with each other and for conducting current from the bypass diode to the battery circuit until a predetermined electrical current flows to indicate a defective battery cell,
wherein the holding means ceases to hold apart the movable contact and the bypass terminal when the predetermined current flows, such that the closing means moves the movable contact into electrical contact with the bypass terminal and current thereafter flows through the movable contact and the bypass to the battery circuit, thereby bypassing the defective battery cell.

7. A battery bypass device as defined in claim 6, wherein the holding means comprises a thermally-activated conductive strip that is heated by the flow of current therethrough such that the force of the closing means can pull the strip apart.

8. A battery bypass device as defined in claim 6, wherein:
the movable contact comprises a generally cylindrical plunger; and
the closing means comprises a coil spring.

9. A battery bypass device as defined in claim 8, wherein the plunger includes a nose portion formed of a non-electrically conductive material.

10. A battery bypass device as defined in claim 6, wherein the switching means is normally closed.

11. A battery bypass device as defined in claim 6, wherein:
the movable contact is elongated in its direction of movement; and
the switching means further includes
a non-electrically-conductive sleeve encircling a portion of the movable contact, and
two or more terminals fixed relative to the switch housing and engageable with either the movable contact or the non-electrically-conductive sleeve according to the position of the movable contact.

* * * * *

UNITED STATES PATENT AND TRADEMARK OFFICE
CERTIFICATE OF CORRECTION

PATENT NO. : 5,362,576

DATED : November 8, 1994

INVENTOR(S) : Thomas Clark, David M. McCormick and Alan Whitebook

It is certified that error appears in the above-identified patent and that said Letters Patent is hereby corrected as shown below:

In Column 2, line 42, after "such" insert --that--.

In Column 7, line 16, change "tile" to --the--.

In Column 8, line 9, after "bypass" insert --terminal--.

Signed and Sealed this

Seventh Day of February, 1995

Attest:

BRUCE LEHMAN

Attesting Officer    Commissioner of Patents and Trademarks